United States Patent [19]
Ray et al.

[11] Patent Number: 5,757,322
[45] Date of Patent: May 26, 1998

[54] CELLULAR WEATHER INFORMATION SYSTEM FOR AIRCRAFT

[75] Inventors: Jimmy C. Ray, Denison; Robert L. George, II, Plano, both of Tex.

[73] Assignee: AirCell, Inc., Louisville, Colo.

[21] Appl. No.: 415,724

[22] Filed: Apr. 3, 1995

[51] Int. Cl.$^6$ .............................. G01S 3/02; G01S 13/00
[52] U.S. Cl. ............................................. 342/460; 342/26
[58] Field of Search ....................... 342/460, 26; 379/58, 379/59

[56] References Cited

U.S. PATENT DOCUMENTS

| | | | |
|---|---|---|---|
| 4,347,618 | 8/1982 | Kavouras | 342/26 |
| 4,792,806 | 12/1988 | Bent et al. | 342/460 |
| 4,806,851 | 2/1989 | Krider et al. | 342/460 |
| 4,841,304 | 6/1989 | Richard et al. | 342/460 |
| 5,111,400 | 5/1992 | Yoder | 342/29 |
| 5,265,024 | 11/1993 | Crabill et al. | 364/443 |
| 5,331,330 | 7/1994 | Susnjara | 342/460 |
| 5,519,761 | 5/1996 | Gilhousen | 379/59 |
| 5,557,656 | 9/1996 | Ray et al. | 379/59 |

*Primary Examiner*—Gregory C. Issing
*Attorney, Agent, or Firm*—Jerry C. Ray

[57] ABSTRACT

Electromagnetic radiation from lightning is detected at a ground station which is part of a cellular network of stations; a computer determines a position of a thunderstorm associated with the lightning, then compiles and stores the storm location data. A user aircraft transmits, via cellular telephone equipment or direct radio link, a request for information together with a user identification number. After validation of the user number weather data is transmitted to the aircraft where a microcomputer processes the weather data to correct for the aircraft's position and heading, then displays storm locations relative to the aircraft. The display may incorporate radar data and satellite photographs of cloud formations. In-flight weather notices are transmitted in addition to the storm location data.

4 Claims, 3 Drawing Sheets

CELLULAR WEATHER INFORMATION SYSTEM FOR AIRCRAFT

BACKGROUND OF THE INVENTION

1. Field of the Invention

This invention relates to devices for detecting and displaying the positions of thunderstorms and other atmospheric disturbances, and in particular to devices and methods for detecting thunderstorms from a network of ground weather stations and transmitting thunderstorm positions to aircraft and other users for display.

2. Description of the Related Art

It is well known that atmospheric lightning emits detectable electromagnetic radiation. Peak currents within a lightning stroke may exceed 40,000 amperes, with an average current around 20,000 amperes. The strokes may be several miles long. Radio noise generated by lightning strokes occurs primarily within the High Frequency and the Very High Frequency bands; each burst of radio noise contains hundreds to thousands of separate pulses.

These discharges are useful to aircraft crews because they can be detected and displayed to provide the crews with information on the position of storms and other disturbances in the general vicinity of the aircraft. The equipment used includes: a cross-loop antenna or a flat-plate antenna for detecting and for determining the direction of the lightning; a sense antenna for determining an approximate distance to the lightning; a computer or other electronic processor to convert the signals into a format suited for display; and a visual display on which to indicate the position of the storms.

The equipment mentioned above for detecting atmospheric electrical activity generated by storms has been in use for some time; one such system is marketed under the name STORMSCOPE. All the equipment for this type of system is carried aboard the aircraft.

Weather radar may be used for the same purpose and is installed on many aircraft. But weather radar, especially mobile units that may be carried aboard aircraft, is unable to effectively penetrate thunderstorms and other activity to show what lies on the far side of such storms. Thus, the weather radar has a limited ability to produce an accurate three-dimensional image of weather activity around an aircraft. Additional drawbacks to weather radar include the cost of installing and maintaining the equipment, and the weight the equipment adds to the aircraft.

Applicant is aware of the following United States patents related to thunderstorm detection:

| U.S. Pat. No. | Issue Date | Applicant |
| --- | --- | --- |
| 4,023,408 | May 17, 1977 | Ryan, et al. |
| 4,115,732 | Sep. 19, 1978 | Krider, et al. |
| 4,198,599 | Apr. 15, 1980 | Krider, et al. |
| 4,383,260 | May 10, 1983 | Ryan |
| 4,395,906 | Aug. 2, 1983 | Ryan, et al. |
| 4,672,305 | June 9, 1987 | Coleman |
| 4,684,951 | Aug. 4, 1987 | Baumer |
| 4,803,421 | Feb. 7, 1989 | Ostrader |
| 4,873,483 | Oct. 10, 1989 | Ostrader |

SUMMARY OF THE INVENTION

Progressive Contribution to the Art

The present invention addresses the problem of making thunderstorm positions and other weather information available to aircraft with little or no extra equipment being required aboard the aircraft. In addition to aircraft, other users such as ship crews, boat crews and meteorologists have ready access to the same weather information.

The invention comprises a network of ground weather stations, each located at or associated with a ground station for a cellular telephone system for aircraft. Each ground weather station has one or more antennae for detecting atmospheric electrical activity generated by storms and other disturbances, electronic equipment to compile and store the received signals, and a transmitter to send the information to a user responsive to a service request. A computer aboard a user aircraft processes the signals to produce a visual display the positions, relative to the aircraft, of atmospheric storms and disturbances. Alternatively, the aircraft sends its position and data to the ground station; a processor at the ground station manipulates the data to show the storm positions relative to the aircraft, and transmitted to the aircraft for display. Provision is also made for the transmission of SIGMET (Significant Meteorology) notices to aircraft on request from the F.A.A.

Objects of this Invention

An object of this invention is to increase the safety of air travel by providing a real-time display of positions of thunderstorms and other atmospheric disturbances.

Another object of this invention is to accomplish the above with little or no additional equipment required aboard the aircraft, so the weather information is available for a lower initial investment and for a lower upkeep cost.

A further object of this invention is to provide thunderstorm position information to an aircraft from several ground locations, so that an aircraft or other user may generate a display of storm activity over a wide area which would not otherwise be available to the user.

Another object of this invention is to increase the safety of commercial and private shipping and boating, by making storm activity information available to ship and boat crews.

The specific nature of the invention, as well as other objects, uses, and advantages, will clearly appear from the following description and from the accompanying drawings, the different views of which are not necessarily scale drawings—in some cases the size of the components have been changed for clarity.

DESCRIPTION OF THE PREFERRED EMBODIMENT

Figure 1:
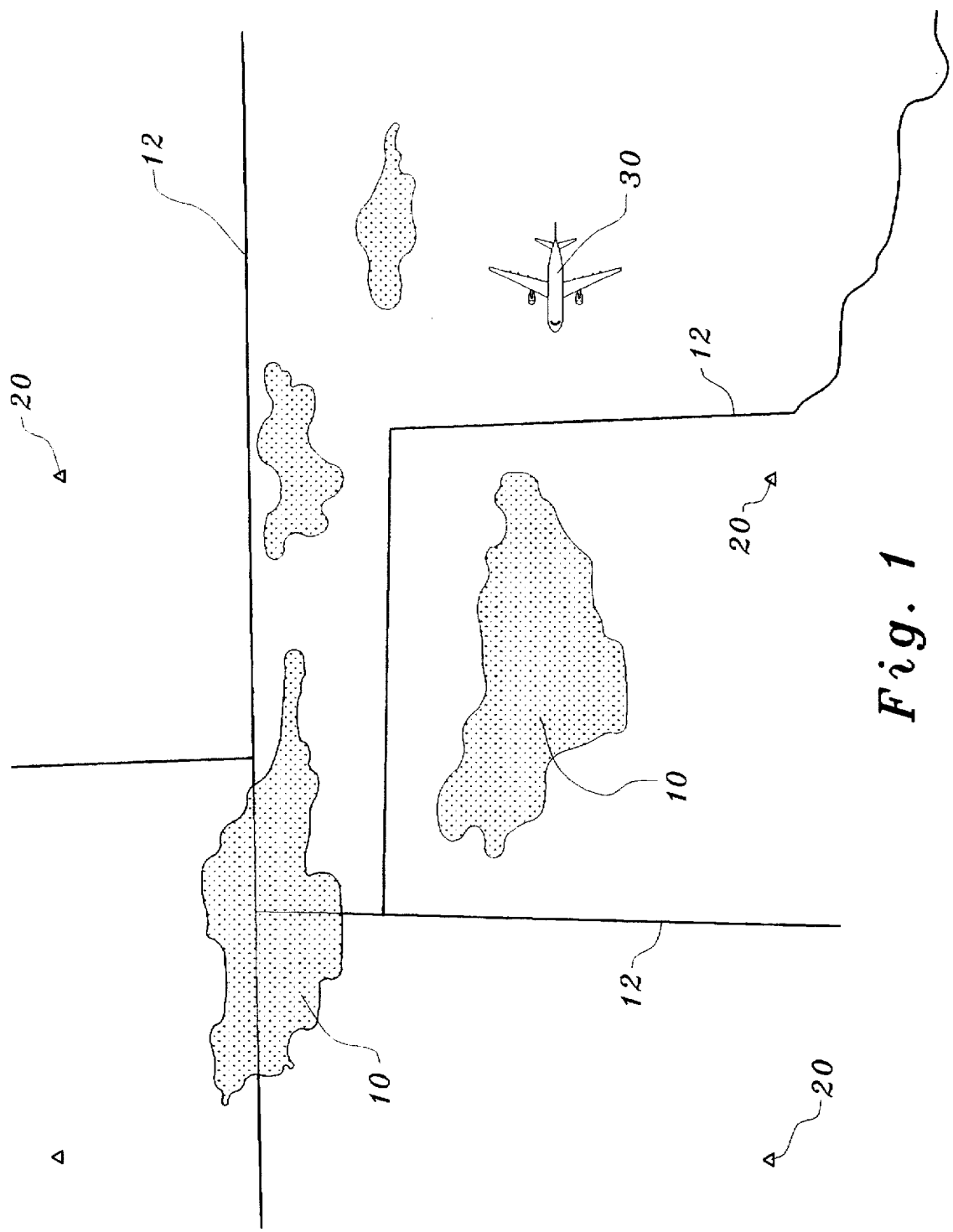
FIG. 1 illustrates an aircraft and ground weather station locations superimposed on a display of the type used by the aircraft crew.

Referring to the drawings, FIG. 1 shows an area of thunderstorms 10. As with a standard weather map, storm locations are shown relative to state borders 12. Pulses of electromagnetic radiation from lightning discharges associated with thunderstorms are detected by antennae at ground weather station 20. At least one of the antennae are directional so that a direction of the thunderstorms relative to the ground weather station can be determined. The directional antennae are a cross-loop configuration antenna, a flat plate antenna, or some other type. Another of the antennae is a sense antenna which detects the magnetic field of the electromagnetic radiation. The approximate distance from the ground weather station to the lightning is determined from the strength of the signal received by the sense antenna. Alternatively, a precise location of thunderstorms 10 is plotted using triangulation between two or more ground weather stations. The triangulation is carried out by processing equipment at one or more of the ground stations, or by equipment aboard the aircraft, ship, or other user.

Each ground weather station includes an interface to a telephone network, and an electronic computer to: (1) process requests for weather information, (2) compile and store weather data, and (3) convert the weather data into a format suitable for transmission. These systems are described more fully below.

Figure 2:
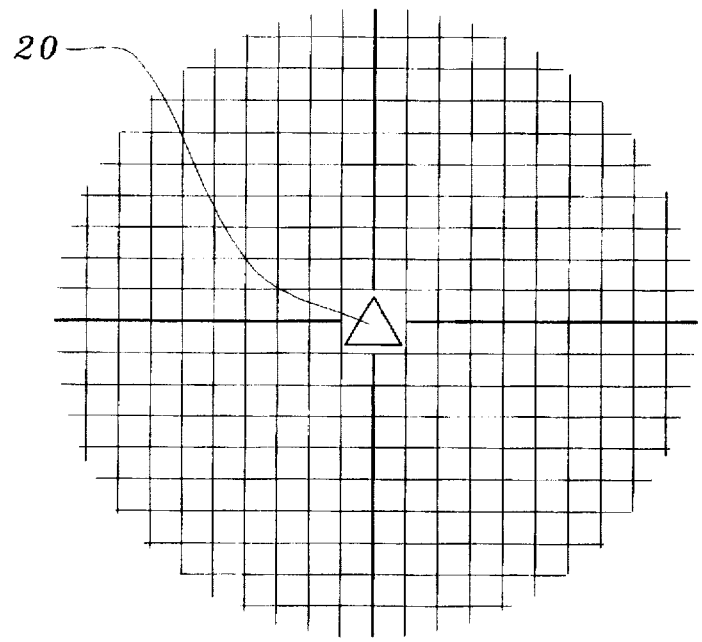
FIG. 2 illustrates the coverage of a single cell in the system, and the grid into which the cell is divided.
Figure 3:
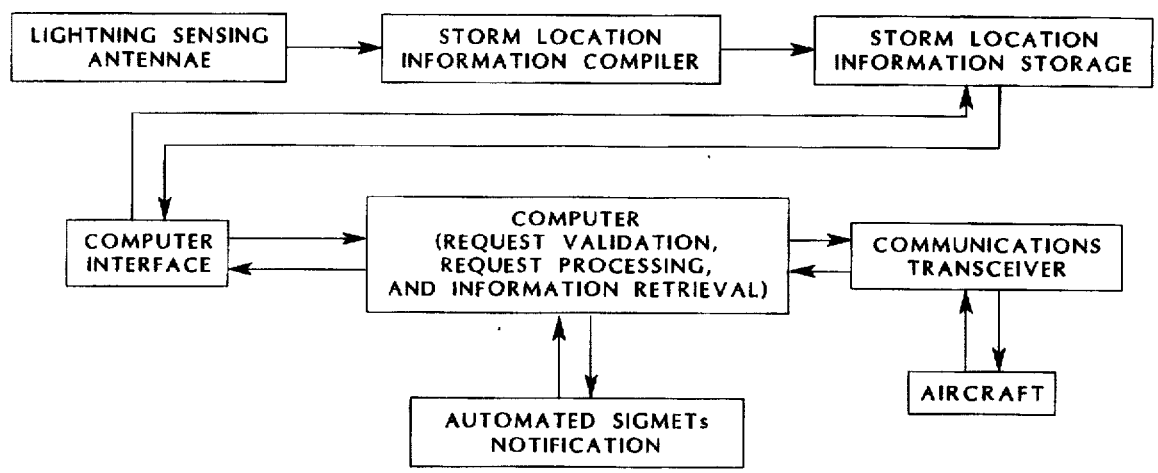
FIG. 3 is a block diagram of the system components and signal paths.

Referring to FIG. 2, the generally circular area covered by each ground weather station is divided into a grid pattern, so that the area is divided into a fixed number of blocks. Each block in the grid has an approximately equal area. A predetermined location of each block is stored in the memory of the processor as a latitude and longitude. When the ground weather station detects a thunderstorm, the position of the storm is compared by the processor to the grid block positions stored in its memory. The latitude and longitude of the block which most closely matches the thunderstorm position is transmitted as the position of the storm. FIG. 3 illustrates, in block diagram form, the components of the system and the signal paths between each component.

Figure 4:
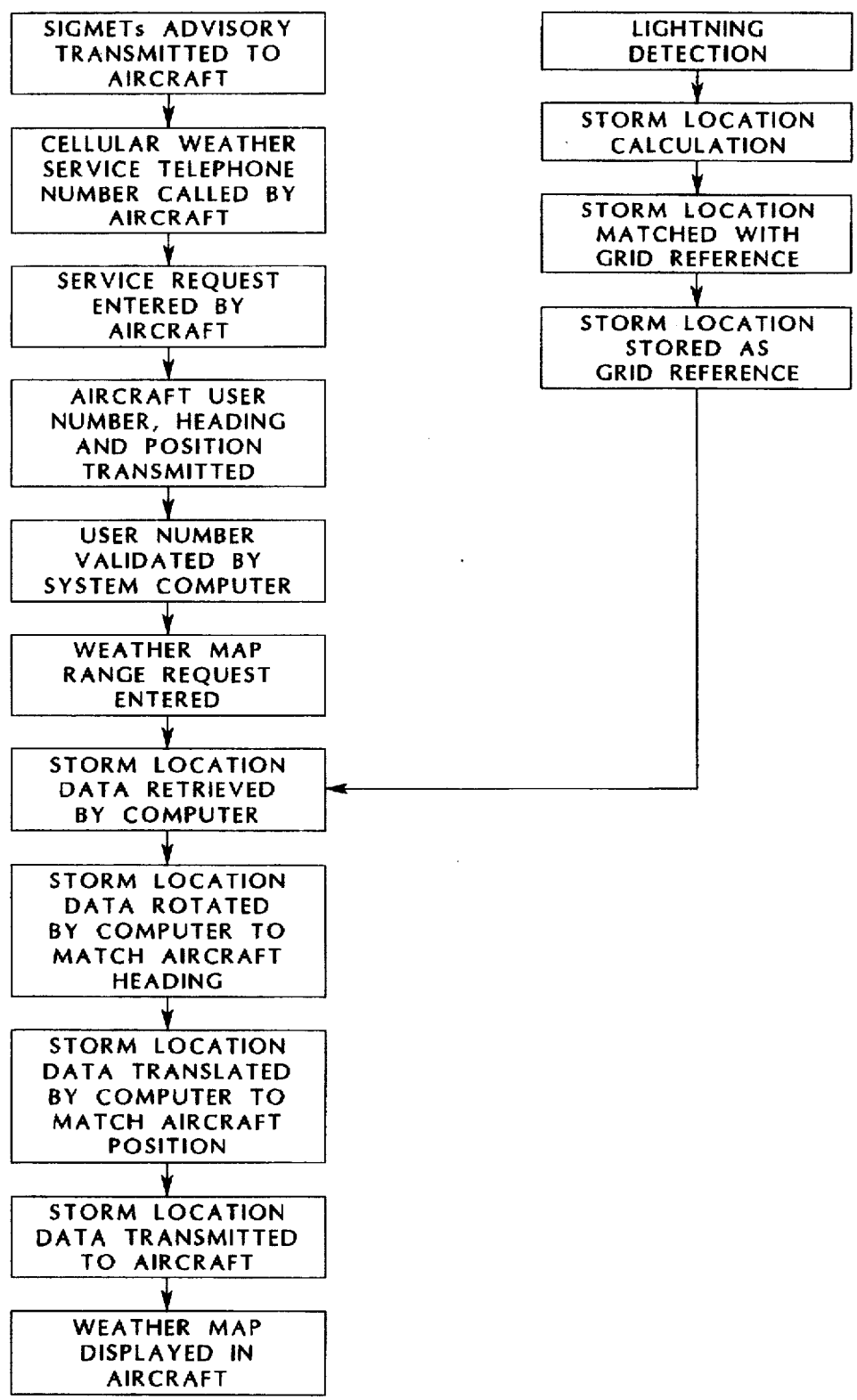
FIG. 4 is a sequence chart illustrating the major steps involved in the invention.

Referring to the sequence chart in FIG. 4, use of the weather information service is initiated when the crew of user aircraft 30 requests weather information from the ground weather station 20. A user aircraft is defined as an aircraft equipped to request and receive weather information from a ground weather station. The request transmitted by the user aircraft includes a system identification number or user number for the aircraft. Alternatively, the initial request contains only the user number, and the heading and position information are sent as a subsequent transmission from the aircraft, in response to a query by the ground station controller.

In one embodiment of the invention, a request for weather data is transmitted by cellular telephone equipment aboard the aircraft. The cellular telephone signals are received by cellular antennae at a ground weather station, and the ground station transmits weather information data back to the user aircraft via the same cellular circuit. The user request is made by dialing, either manually or automatically, a telephone number assigned to the ground station. The cellular telephone system for aircraft was recently granted a license by the F.C.C., for operation within the existing cellular telephone frequency assignments. Currently being installed, the new telephone system for aircraft includes a cellular network of base stations which transmit and receive cellular telephone signals to and from aircraft. One version of the air cellular system uses the same frequency allocations as the existing ground cellular telephone system; directional antennae and other techniques prevent interference between the two systems.

It is contemplated that many or most weather ground stations will be located on the structure supporting an air cellular telephone base station. The service area for a weather ground station is defined as the area served by the air cellular telephone base station associated with the ground station. It is understood that in some instances a ground station may not be physically associated with an air cellular base station, but will have a communications link to such an air cellular base station.

Each weather ground station has one or more telephone numbers associated with it. A modem serves as the interface between the telephone system and the data base containing the weather information. When a user aircraft calls for weather information from a particular weather ground station by calling a telephone number for that station, a controller first verifies the aircraft user number. Using the telephone keypad to enter requests, the crew member will enter, e.g. "1" to request an area map of storm activity. Then "25," 50, "100," or "200" will be entered to determine the radius, in nautical miles, of the display. A default range will be entered automatically if no request is made for a specific range. After the request has been determined to be legitimate, i.e., the user identification number has been determined valid, stored storm location data is transmitted to the aircraft via the cellular telephone link.

A micro-computer on board the aircraft processes the raw storm location data before it is displayed. It is necessary to re-orient the weather data relative to the aircraft heading, because the data is transmitted in a "north is up" orientation relative to the ground weather station. When displayed aboard the aircraft, however, the "up" direction (toward the top of the display) corresponds to the aircraft heading. Also, unless the aircraft is directly over the ground station, the data must be translated, i.e., laterally displaced, so that the displayed distance to the thunderstorm corresponds to the actual distance from the aircraft to the storm.

The on-board computer performs the re-orientation of the data in two steps. In one step, the processor computes the difference between the aircraft heading and true north, and then rotates the data so that the display is properly oriented relative to the aircraft heading. In another step, the distance and bearing from the weather ground station location to the aircraft position are also computed; this result is used in a translation of the data so that the display in the aircraft shows the thunderstorm position at the correct distance from the aircraft.

Alternatively, the raw storm location data are processed by a computer associated with the ground station. In this embodiment, the aircraft's heading and its latitude and longitude are transmitted either with the initial service request or as a separate transmittal after the user number is verified. The ground station computer then uses the aircraft position and heading to re-orient the weather data, in the manner described above for a computer on board the aircraft, to be sent to the aircraft. After the processor has completed re-orientation of the data, the processed data is transmitted to the aircraft via the same telephone circuit by which the aircraft made the initial service request.

In another embodiment, an aircraft makes a request for weather information via a direct radio link to the ground station; i.e., by a link that does not include a cellular telephone circuit. In this embodiment, each ground station is equipped with radio transceiving equipment which operates at preset frequencies. As in the previous embodiment, an identification number is transmitted to the ground station controller to establish the call as legitimate before the weather data is transmitted.

In the embodiment using a direct radio link, the data including the position of the thunderstorms are sent from transmitting antenna. The transmitting antennae may be located at the weather ground stations, or at some suitable remote location. A receiving antenna aboard aircraft receives the signal transmitted from ground stations.

For wider applicability, it is preferred that the processor encode the data into a standardized format for transmission. This standardized format will be a packet of data which includes fixed information identifying the particular weather ground station by an identification number or by its latitude and longitude, and a larger amount of variable data conveying weather information.

It is understood that an aircraft may maintain a connection with a ground weather station over an extended period of time to obtain continuously updated weather information. This situation will arise where an aircraft is approaching an airport during bad weather, or is trying to fly between two or more weather disturbances along its route.

Where several aircraft have simultaneous connections to one ground station, the controller at that ground station transmits packets of data to each aircraft in sequence. Thus the data received by each aircraft will be interrupted while the ground station services other requests. The interruptions, however, will be no more than several seconds, so that each aircraft or other user will receive an essentially continuous stream of data from the ground station.

Upon reception by an aircraft or other user, the data are displayed on the screen of a cathode-ray tube or of a liquid-crystal display, on a printed hard copy, or otherwise.

It is contemplated that each weather ground station will include instrumentation to measure local barometric pressure, temperature, humidity, and wind speed and direction, and will include these data in its telemetry to aircraft or to other users. The data packet described above will have an assigned set of bits to convey these local measurements, which may have a separate display from the thunderstorm position display.

Many aircraft are equipped with facsimile (FAX) machines to receive weather radar summaries and satellite photographs of cloud cover. Information from the weather ground stations can be combined with radar summaries and satellite photographs. These combined views will give aircraft crews a more accurate and comprehensive real-time view of the weather in the vicinity of their aircraft and along their planned route.

After the aircraft is through the area of bad weather, or when the weather information service is no longer required, the aircraft crew terminates the service either by disconnecting the call or by sending a disconnect code. The aircraft crew may stay on-line with the ground station for a period of time so as to receive continuous weather updates, or may make a series of calls to one or more ground stations when less frequent updates are desired. In either case, the controller at the ground station records the number of calls made by each user aircraft, and the duration of each call.

In-flight weather advisories called SIGMETs, for Significant Meteorology, are broadcast over FAA flight service station frequencies when actual weather conditions become worse than those forecast. The present invention allows SIGMETS to be transmitted to aircraft in a specific area. On request by the FAA, SIGMETs are transmitted automatically to each user aircraft requesting weather information, as an addendum to the information provided by the particular ground station which was queried. Alternatively, user aircraft equipped with cellular telephones are called via the ground station in their area, and are asked if they wish to receive the latest SIGMET notice for their area. This active calling is possible because the positions of cellular-telephone-equipped aircraft are tracked by the computer controller for the cellular telephone system. In many cases, the computer controller will be the same computer which manages cell switching and traffic routing for the ground cellular telephone system. This latter embodiment, involving active calling of user aircraft, is also performed at the request of the FAA.

The embodiments shown and described above are only exemplary. We do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

We claim as our invention:

1. An apparatus for providing thunderstorm positions to aircraft and to other users, comprising:
    means for detecting at one or more ground stations electromagnetic radiation from lightning,
    means for determining from the electromagnetic radiation a position relative to a ground station of at least one thunderstorm, said means for determining a position of a thunderstorm including means for triangulating at least two bearings of an atmospheric disturbance from at least two ground stations a known distance apart to determine a precise position of the atmospheric disturbance,
    means at said ground station for receiving, via a cellular telephone system, from a user aircraft a request for weather data, said request including an identification number of said user aircraft and a position and heading of said user aircraft for processing by said ground station,
    means at said ground station for processing said thunderstorm position to determine said position relative to said aircraft including rotating and translating said position of the thunderstorm relative to the ground station,
    means for transmitting, via a cellular telephone system, said thunderstorm position relative to said user aircraft and other weather data to said user aircraft,
    means aboard said user aircraft for receiving said thunderstorm position,
    means aboard said user aircraft to combine thunderstorm position data received from more than one ground station,
    means aboard said user aircraft to display said combined thunderstorm positions as a regional display of thunderstorm activity,
    means aboard said user aircraft for displaying said thunderstorm position relative to said user aircraft, and
    a location of said ground station being coincident with a location of an air cellular telephone base station.

2. The invention as described in claim 1, wherein:
    said ground stations are connected to an existing telephone network, each of said ground stations are assigned at least one telephone number, and said ground stations transmit positions of thunderstorms responsive to said user aircraft calling said telephone number and transmitting to the ground station a request including a user aircraft identification code.

3. An apparatus for providing thunderstorm positions to aircraft and to other users, comprising:
    means for detecting at one or more ground stations electromagnetic radiation from lightning, means for determining from the electromagnetic radiation a position relative to a ground station of at least one thunderstorm, said means for determining a position of a thunderstorm including means for triangulating at least two bearings of an atmospheric disturbance from at least two ground stations a known distance apart to determine a precise position of the atmospheric disturbance, means at said ground station for receiving, via a cellular telephone system, from a user aircraft a request for weather data, said request including an identification number of said user aircraft and a position and heading of said user aircraft for processing by said ground station, means for transmitting, via a cellular telephone system, said thunderstorm position and other weather data to said user aircraft, means aboard said user aircraft for receiving said thunderstorm position, means aboard said user aircraft for processing said thunderstorm position to determine said position relative to said aircraft, said means for processing said thunderstorm positions including rotating said thunderstorm positions to correct for said aircraft's heading and translating said thunderstorm positions to correct for said aircraft's position relative to the ground station so that a subsequent display of thunderstorm positions shows said thunderstorm positions relative to a heading and position of said aircraft, means aboard said user aircraft to combine thunderstorm position data received from more than one ground station, means aboard said user aircraft to display said combined thunderstorm positions as a regional display of thunderstorm activity, means aboard said user aircraft for displaying said thunderstorm position relative to said user aircraft, and a location of said ground station being coincident with a location of an air cellular telephone base station.

4. The invention as described in claim 3, wherein:

said ground stations are connected to an existing telephone network, each of said ground stations are assigned at least one telephone number, and said ground stations transmit positions of thunderstorms responsive to said user aircraft calling said telephone number and transmitting to the ground station a request including a user aircraft identification code.

* * * * *